April 11, 1967     H. U. BLACKWOOD     3,313,027
FOLDABLE SURVEYING INSTRUMENT
Filed May 11, 1965
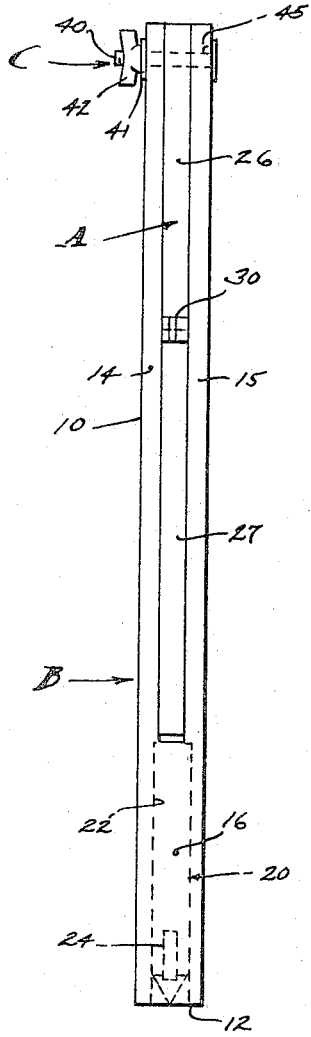
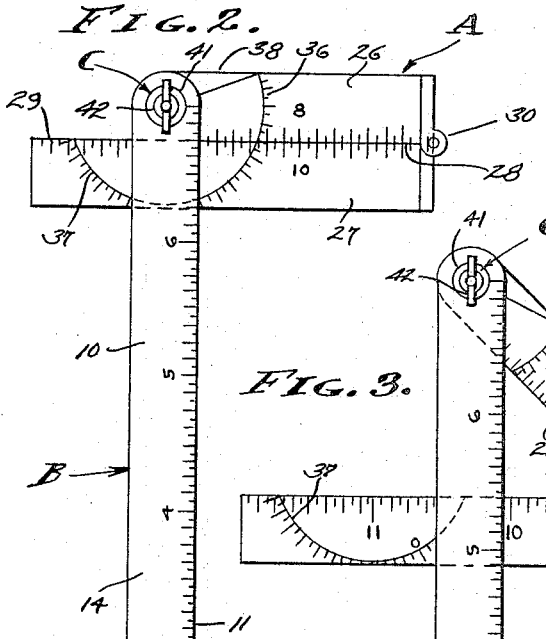
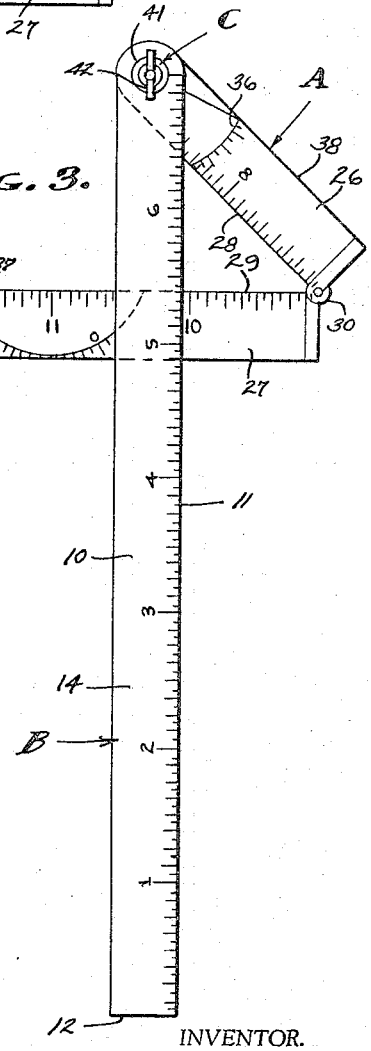
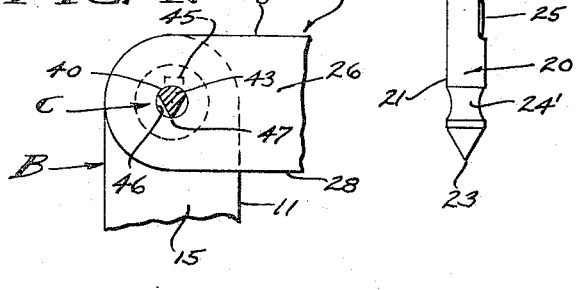
INVENTOR.
HENSEN U. BLACKWOOD
BY
AGENT 3,313,027
FOLDABLE SURVEYING INSTRUMENT
Henson U. Blackwood, 830 S. Fairfax Road,
Bakersfield, Calif. 93307
Filed May 11, 1965, Ser. No. 454,916
5 Claims. (Cl. 33—105)

This invention relates to a surveying instrument advantageously combining the combination of a straight edge, a plumb and a protractor, all of which are co-operatively related so as to form a useful tool, it being a general object of this invention to provide a folding tool of the character referred to and which has a plurality of uses.

The usual surveying instruments require complexity, and are therefore rather expensive and out of reach of the ordinary person. However, in the course of building, an ordinary person has the ability to survey providing he has suitable tools made available to him. The folding surveying instrument that I provide is such a tool and avoids complexity, being basic in its concept and to the end that its utility is apparent. With the instrument hereinafter disclosed the structure is unfolded and rearranged in various manners. In one instance, the rearrangement provides a straight edge and a protractor which is related to either a plumb or a spirit level. In a second instance, the rearrangement provides a variable triangle. In a third instance, the rearrangement forms an angle or carpenter's square or a T-square.

It is an object of this invention to provide a combination tool for use in the instances above recited and which can be observed to indicate angles related to horizontal and/or perpendicular, to indicate inclines and angular relationships, and all of which are shown by conventional calibrations.

It is another object to provide a tool of the character referred to that has a plurality of uses referred to commonly as, use as a scale, use as a square, use as a T-square, and all in addition to the special use as a plumb and incline indicator.

The various objects and features of this invention will be fully understood from the following detailed description of the typical preferred form and application thereof, throughout which description reference is made to the accompanying drawings, in which:

FIG. 1 is a side elevation of the instrument shown in a folded condition.

FIG. 2 is a front view of the instrument unfolded and rearranged for one of its uses.

FIG. 3 is also a front view of the instrument showing it rearranged for another of its uses.

FIG. 4 is a sectional view showing the coupling parts as they occur when the elements of the instrument are positioned as shown in FIG. 2.

The instrument that I provide is a folding instrument that is especially useful as a surveying tool and the like. As is shown throughout the drawings the instrument is subject to various rearrangements and adjustments which make it adaptable to a multitude of uses. In FIG. 1 the folded inactive condition thereof is shown, and in the various remaining figures the several typical rearrangements are indicated. As shown, the instrument involves, generally, a body B and a sectional arm A. The body B is of substantial construction and such as to house the arm A, the said arm being sectional in order to establish the protracting feature that is necessary for the utility of the instrument. Also, the arm A is angularly shiftable relative to the body B and to this end the invention involves a balancing coupling C adapted to both balance and to fix the elements A and B relative to each other.

The body B is a straight square or rule-like element and is characteristically elongate with at least one flat side 10 having a straight edge 11, the said edge 11 is graduated in inches between the lowermost end 12 and the coupling C. As shown, the body B is rectangular in cross section and comprised of two like side members 14 and 15 joined at one end by a spacer 16 extending therebetween and which holds the members 14 and 15 so that they extend parallel one with the other and with an open space therebetween.

In carrying out the invention a spirit level 20 is retractably carried by the spacer 16, said spirit 20 being a cylinder 21 both slidably and rotatably engaged in the bore 22. The axis of said bore 22 and cylinder 21 is common to the center of the body B cross section and the lowermost terminal end of the cylinder 21 is convergent and pointed, the point 23 thereof being coincidental with said center of the body B. As shown, the spacer 16 is provided with a recess and carries a detent spring 24 that engages alternately in notches 24' in order to retain the cylinder 21 in the desired selected position. Thus, the spirit 20 is retractile for baring the end of the body B and is preferably made of metal and for instance is a lead filled shell having a window which visibly exposes a crowned glass 25 that is suitably filled with a liquid and bubble and marked to indicate when the cylinder is horizontal.

The arm A is sectional and is secured between the members 14 and 15 by the coupling C, in practice the cross section of the arm is such as to fully occupy the space between the members 14 and 15 and said arm sections are also straight scale-like parts graduated in inches from the coupling C to the outer extremity thereof. As shown, there are inner and outer arm sections 26 and 27 hingedly joined at one side whereby they normally abut end to end in continuing one from the other. Thus, there are edges 28 and 29 at which the respective arm sections are hinged and which can be brought together into flat engagement and so that the two sections can lie adjacently alongside each other. In accordance with the invention, the hinge 30 is a relatively tight friction hinge having frictionally engaged bars fastened into the arm sections 26 and 27 respectively. As a result, the arm sections can be manually moved to angularly selected positions where they remain.

In accordance with the invention the inner and outer arm sections 26 and 27 can be unfolded from the housing position shown in FIG. 1 to the protracting position shown in FIG. 2, the section 27 being characteristically longer than the section 26. And, the two sections combine to establish a protracting arc, there being a protractor arc 36 on section 26 and a protractor arc 37 on section 27. The two protractor arcs 36 and 37 are scribed on the arm sections so as to be concentric with the axis of the coupling C hereinafter described when the arm sections are rearranged so as to lie with the edges 28 and 29 adjacently engaged as above stated. In practice, the radius of the arcs 36 and 37 is identical and such as to extend 180° between the edge 38 that occurs opposite the edge 28 and the edge 29. Therefore, the inner arc 36 on inner arm section 26 extends arcuately between the edges 28 and 38, while the outer arc 37 on outer arm 27 arches longitudinally of the edge 29. The arc 37 terminates at the terminal end of section 27, as shown.

In accordance with the invention the side member 14 and/or 15 is of a width to cooperate with the calibrating of the protractor arcs 36 and 37 and so as to indicate null or 0° when the adjacently related arm sections 26 and 27 are right angularly disposed to the body B. As is clearly shown in FIG. 2, the half breadth of member 14 is such that the edge 11 thereof occurs midway between the extremes of the 180° combined arc 36–37, whereby 0° is indicated when arm A is normal to the body B. The combined arc 36–37 is calibrated in conventional degree, or percentage, markings extending 90° in opposite directions.

The balance coupling C is provided to pivotally join the sectional arm A to the body B and serves on one hand to permit free movement between elements A and B and alternately on the other hand to clamp the elements A and B fixedly as positioned, all as circumstances require. The coupling C comprises a bolt 40 with a head bearing on one side member 15 and with a clamp 41 to releasably bear on side member 14. The bolt 40 is threaded to receive a nut 42 for operating the clamp 41 into pressured engagement with the member 14, and the bolt body 43 is free to revolve with minimum clearance in a bore opening 46 in the arm element 26. In order to gain maximum freedom of movement, the bolt 40 has a key 45 at the head and which engages in the member 15 to prevent rotation relative to the body B while the center portion of the bolt has a downwardly disposed knife edge 47 for supporting engagement with the opening 46 in the arm section. Thus, the elements A and B can be revolved relative to each other and then supported one from the other on the knife edge 47 for accurate dependence of the body B as a plumb.

From the foregoing it will be apparent that the foldable tool is useful as a surveying instrument wherein the body B accurately depends on a perpendicular, and from which the angular relationship of the arm A is readily determined in the protractor arcs 36 and 37. The combined arm sections 26 and 27 are held manually at arms length, for example, and the straight edge 28 or 29 is sighted over and moved in order to correspond with a distant object to be surveyed. That is, any disposition or line of a distant object can be sighted and related to the arm A and the angular relationship indicated clearly on the protractor arcs 36–37. Further, the tool or instrument is useable as shown in FIG. 3 to establish triangles of the parts 14, 26, and 27, whereby the proportions of inclines and pitches are readily determined as indicated by the inch markings and fractions at the edges of said elements. Still further, the instrument is useable as a T-square when arranged as shown in FIG. 2, and also as a depth gage when arranged as shown in FIG. 3. With ingenuity there are other uses which will be obvious from the description and drawings.

Having described only a typical preferred form and application of my invention, I do not wish to be limited or restricted to the specific detail herein set forth, but wish to reserve to myself any modifications or variations that may appear to those skilled in the art and fall within the scope of the following claims.

Having described my invention, I claim:

1. A foldable surveying instrument comprised of complementary elements and including, an elongated body element having an edge, a sectional arm having an inner section element pivotally joined to one end portion of the body element on an axis space inwardly from the edge thereof and having an outer section element hinged to lie alongside the inner section, and calibrated protracting arcs scribed in the two sections on identical radii concentric with the axis of pivotal joinder when the inner arm section and outer arm section lie alongside each other, whereby the edge of the body element intersects the combined arc when the said sections are angularly disposed to the body.

2. A foldable surveying instrument including, an elongate body having an edge, a sectional arm having a short inner section pivotally joined to one end portion of the body and having a long outer section hinged to lie alongside the inner section, and calibrated protracting arcs scribed transversely of the inner section and longitudinally of the outer section and on identical radii concentric with the axis of pivotal joinder when the inner arm section and outer arm section lie alongside each other, whereby the combined arc extends oppositely from the body and the edge of the body intersects the combined arc when the said sections are angularly disposed of the body.

3. A foldable surveying instrument comprised of complementary elements and including an elongate body element having an edge, a sectional arm having end to end abutted inner and outer section elements hingedly joined at one edge, revolubly releasable means pivoting said inner section element to one end portion of the body element on an axis spaced inwardly from the edge thereof and said outer section element adapted to shift so as to lie adjacently alongside the inner section element, and calibrating protracting arcs scribed in the two sections on identical radii concentric with the axis of pivotal joinder when the inner arm section and outer arm section lie alongside each other, whereby the edge of the body intersects the combined arcs when the said sections are angularly disposed to the body.

4. A foldable surveying instrument including an elongate body having an edge, a sectional arm having end to end abutted inner and outer sections hingedly joined at one edge, revolubly releasable means comprising a cylindrical bolt rotatively fixed through one end portion of the body and with a knife edge pivotally bearing in a bore in said inner section and said outer section adapted to shift so as to lie adjacently alongside the inner section, and calibrated protracting arcs scribed in the two sections on identical radii concentric with the pivot of the inner arm section to the body, whereby the edge of the body intersects the combined arcs when the said sections are angularly disposed to the body.

5. A foldable surveying instrument including, an elongate body comprised of spaced side members, a sectional arm having end to end abutted inner an outer sections normally housed between the body side members and hingedly joined at one edge, revolubly releasable means comprising a cylindrical bolt rotatively fixed through the side members of the body and with a knife edge extending therebetween and pivotally bearing in a bore in the said inner section and said outer section adapted to shift so as to lie adjacently alongside the inner section, and calibrated protracting arcs scribed in the two sections on identical radii concentric with the pivot of the inner arm section to the body, whereby the edge of the body intersects the combined arcs when the said sections are angularly disposed to the body.

References Cited by the Examiner

UNITED STATES PATENTS

| | | | |
|---|---|---|---|
| 298,471 | 5/1884 | Hutchinson | 33—75 |
| 597,330 | 1/1898 | Schubert | 33—105 X |
| 874,751 | 12/1907 | Ellington | 33—98 |
| 978,525 | 12/1910 | Werts | 33—105 X |
| 1,004,222 | 9/1911 | Whitlock | 33—75 |
| 1,501,837 | 7/1924 | Benjamin | 33—98 |
| 1,999,105 | 4/1935 | Milla | 33—98 |

LEONARD FORMAN, *Primary Examiner.*

H. N. HAROIAN, *Assistant Examiner.*